United States Patent [19]

Edwards

[11] Patent Number: 5,138,617
[45] Date of Patent: Aug. 11, 1992

[54] METHOD FOR MASKING FALSE BOUND FAULTS IN A CENTRAL PROCESSING UNIT

[75] Inventor: David S. Edwards, Phoenix, Ariz.

[73] Assignee: Honeywell Bull Inc., Billierica, Mass.

[21] Appl. No.: 483,614

[22] Filed: Feb. 21, 1990

[51] Int. Cl.[5] .............................................. G06F 11/00
[52] U.S. Cl. ................................................... 371/16.1
[58] Field of Search .................... 371/16.1, 12, 19, 35, 371/15.1; 364/184

[56] References Cited

U.S. PATENT DOCUMENTS

| | | | |
|---|---|---|---|
| 4,025,771 | 5/1977 | Lynch, Jr. et al. | 364/736 |
| 4,437,149 | 3/1984 | Pomerene et al. | 364/200 |
| 4,456,996 | 6/1984 | Haas et al. | 371/41 |
| 4,641,305 | 2/1987 | Joyce et al. | 371/16.1 |
| 4,646,298 | 2/1987 | Laws et al. | 371/16.1 |
| 4,922,491 | 5/1990 | Coale | 371/16.1 |
| 4,967,387 | 10/1990 | Shibasaki et al. | 371/16.1 |

Primary Examiner—Jerry Smith
Assistant Examiner—P. Chung
Attorney, Agent, or Firm—J. S. Solakian; J. H. Phillips

[57] ABSTRACT

In a computer system having a hardware and/or firmware design problem which causes a false boundary error under certain conditions, the subject method serves to handle and correct the false boundary error condition in the operating system. This recovery process is carried out such that the information from which the faulting address was developed is redistributed among a plurality of information components in such a manner that the false boundary error will not recur on retry. Thus, the process masks the problem by remapping the virtual address components of the faulting instruction so that the final virtual address, though identical to the failing one, is processed without fault by the central processor unit during recovery.

6 Claims, 5 Drawing Sheets

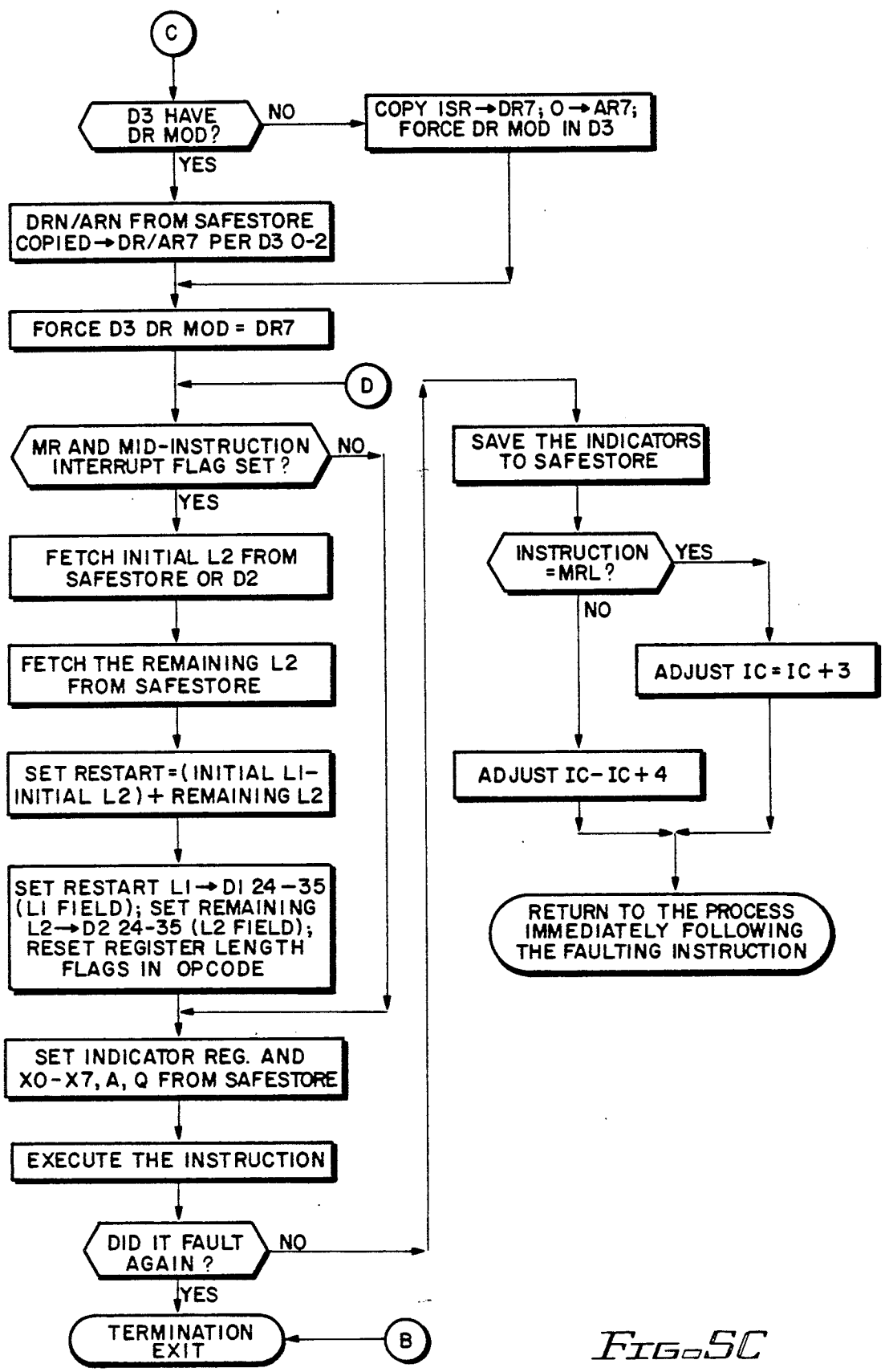

METHOD FOR MASKING FALSE BOUND FAULTS IN A CENTRAL PROCESSING UNIT

FIELD OF THE INVENTION

This invention relates to the art of data processing and, more particularly, to a specialized process for handling a certain class of hardware/firmware design faults in the operating system software.

BACKGROUND OF THE INVENTION

Those skilled in the data processing art will understand that a computer system can be roughly divided into four components; viz.: hardware, the operating system software, applications software and users. The hardware provides the basic computing resources, and the applications software defines the utilization of these resources to solve the computing problems of the users. The operating system controls and coordinates the use of the hardware among the various applications programs for the users.

The hardware contains one or more central processing units which each include instruction decoding and development circuitry or the equivalent which may be implemented in firmware. There is also typically provided an error sensing facility that can include the capability for alerting the operating system to the presence of a detected error. One type of error which may be sensed is a boundary fault in which a memory address which has been developed falls outside the bounds of the addressable memory in a given system. A closely related error, which may be sensed by a boundary error sensing facility in a central processing unit incorporating virtual memory and a security feature, is a boundary fault which occurs if a process attempts to access a memory address outside of the area, or block of memory addresses, to which it has been limited. This access limitation is ultimately controlled by the operating system, but a process may "shrink" or use a subset of its total memory for data isolation purposes. If the process acquires a visibility to a section of memory, then attempts to access memory outside this section, a boundary fault, or boundary error, will occur. This feature provides a level of security within the system by making it impossible for one task, or process, to gain access to another process' (or the operating system's) memory without authorization. A straightforward response to sensing a boundary error is to issue an error message, perhaps after a retry to eliminate the possibility that a transient error in decoding and development took place.

An anomalous situation occurs when a false boundary error condition is sensed. This condition can arise when there is a subtle design error in the instruction decoding and development circuitry and/or firmware such that, under certain rarely occurring address development conditions, the false boundary error condition is sensed. Upon retry, it will again recur. If the specific hardware in which the design error is discovered is still in development, it can simply be corrected, typically with appropriate changes in firmware. However, if the condition is so elusive that it is only discovered after numerous systems have been installed for commerical and/or other field operation, the cost of correcting the hardware/firmware can be virtually prohibitive, particularly if the system type is nearing the end of its life cycle. According to the present invention, the correction of a false boundary error is effected by its efficient handling in the operating system.

OBJECTS OF THE INVENTION

It is therefore a broad object of this invention to provide means for handling and correcting a false boundary error condition.

It is a more specific object of this invention to provide means for handling and correcting a false boundary error condition in the system operating system.

It is a still more specific object of this invention to provide means for handling and correcting a false boundary error condition in the system operating system in such a manner that the information from which the faulting address was developed is redistributed among a plurality of information components in such a manner that the false boundary error will not recur on retry.

In another aspect, it is an object of this invention to provide means for handling and correcting a false boundary error condition effectively and economically (in relation to the cost of updating the hardware/firmware in the field) by masking it using error recovery software resident in the operating system.

SUMMARY OF THE INVENTION

Briefly, and contrary to the teachings of the prior art, these and other objects of the invention are achieved by a software procedure incorporated into the operating system that remaps the virtual address components that triggered the fault prior to a retry.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIGS. 5A, 5B and 5C, taken together, constitute a complete flow chart of the inventive process as it may be practiced in the exemplary environment of a computer system having the described exemplary hardware/firmware fault and employing the GCOS 8 operating system.

DETAILED DESCRIPTION OF THE INVENTION

Glossary of Common Terms

Figure 1:
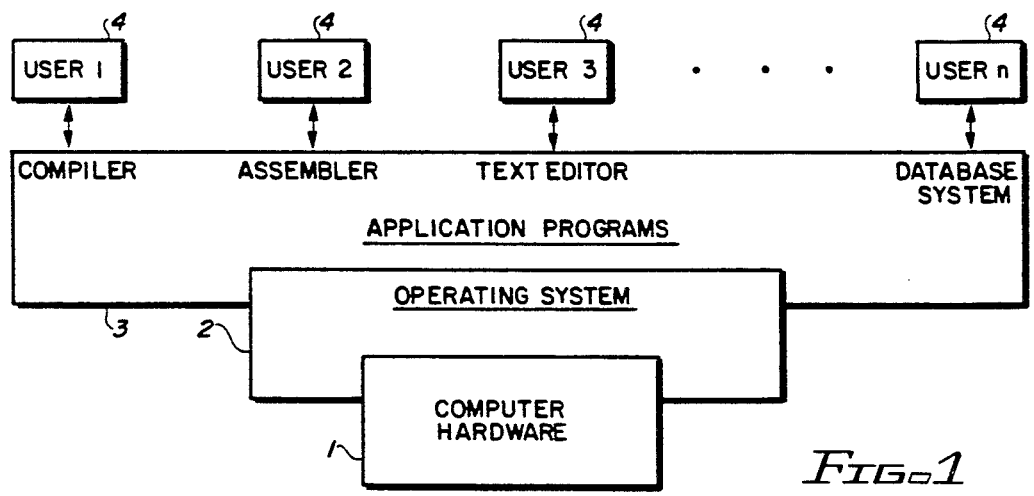
FIG. 1 is a generalized diagram showing the relationship between computer hardware, the operating system, applications programs and users.

The following is a mini-glossary of common terms used throughout the following specification:

adsc4—four bit (packed) byte character mode.
adsc6—six bit (BCD) byte character mode.
adsc9—nine bit (ASCII) byte character mode.
AWDX—Load Address Register with a Word Displacement. During execution of this instruction, the identified address register is loaded directly from the address field of the instruction, (e.g., AWDX 4,, p1 results in ar1=000004).

d1—The second word of a multiword EIS instruction. It typically identifies the operand string 1 that is to be processed.

d2—The third word of a multiword EIS instruction. Its usage varies by instruction.

d3—The fourth word of some multiword EIS instructions. It typically identifies the location for storing results from various searches.

DR1, DR2—(also see definition of Segment Descriptors) The hardware platforms that the exemplary GCOS 8 operating system supports have eight operand segment Descriptor Registers referred to as DR0, DR1,→ DR7. The information stored in these registers is typically used for framing data that a process is processing.

EA—Effective address; often the sum of more than one entity which could include an address field, address register and register offset. A multiword EIS instruction must calculate n number of effective addresses to address through an entire operand string, where n is approximately equal to the number of word pairs involved with the operation.

EAf—The greatest effective address for a given multiword instruction operand string. It is equal to the EAi+ (length−1). For the reverse alphanumeric instructions, this actually identifies the effective address for the start of the operation.

EAi—The initial effective address, irrespective of the assigned length.

ISR—Instruction segment register which contains information framing the instruction area for a process job.

l1—The length, or number of characters, associated with d1.

l2—The length, or number of characters, associated with d2.

LDA—Load the Accumulator Register. This instruction loads the A register from memory or copies the y (address) field directly into the A register if a special modifier (,du or ,dl) is used when the instruction is written (e.g., LDA 1,dl results in the A register set to 000000000001).

LDDn—Load Descriptor Register n (where n=0 to 7) The primary instruction used for loading operand segment descriptors (DR0 etc.,).

LDXn—Load Index Register n (where n=0 to 7). An instruction which loads an index register, either from a value contained within memory or, if coded as ldx5 1,du, the value preceding the du designator is loaded directly (in the example, x5 would equal 1 after the execution).

LREG—Load Registers. This instruction loads the registers that are involved with most basic-op data manipulation. They are the A (accumulator), Q (quotient), index X0 thru X7, Exponent and Timer registers.

MF1—Modification Field 1. This field is used to specify the Multi-Word EIS instruction d1's options (modifications). The field contains four option selections. They are:

AR—when set, indicates that AR/DR modification is required.

RL—when set, indicates that the instruction's length is contained within a register.

ID—when set, indicates that indirection is used to find the instruction's d1, d2 or d3.

REG—identifies a register (A, Q, or index register) that is used for effective address generation.

There exists an MF2 for each of the four instructions to be dealt with and an MF3 for those with a d3 (i.e., SCDR, SCMR and TCTR).

MIF Indicator—Multi-Word Interrupt Indicator. This indicator (one of the indicators kept within the Indicator Register) sets whenever a Multi-Word EIS instruction is interrupted or faults.

MRL—Move Right to Left. A Multi-Word EIS instruction that moves contiguous characters from one area (identified by d1) to another area (defined by d2). This instruction is a "reverse" type in that, rather than starting the move from the first character identified, it starts with the last character and works from it towards the first character.

Multiword EIS Instruction—Those instructions within the processor instruction set that require three or four words, depending upon the exact instruction, to express to the processor the exact operation to perform and to describe the various operand fields involved.

OCLIMB—Outward CLIMB. An instruction which reloads the program visible registers that were stored in conjunction with a previous interrupt or fault (or Inward CLIMB). It is used by software to force a hardware restart of an interrupted or faulted process.

Pointer and Length Data—CPU interrupt recovery information that is saved into a safestore frame when a multi-word EIS instruction is interrupted or faults. The length value saved equals the number of characters left to process.

Recovery Gate—A software mechanism that is used to prevent simultaneous use of a data storage area by multiple central processing units.

Resumption—The act of restarting an instruction at an intermediate execution stage, usually at the point of interruption.

Retry—The act, by software, of totally restarting the execution of an instruction.

Retry Buffer—A data storage area, within the GCOS 8 operating system, for fault recovery support.

Safestore Stack—An area in memory devoted to the central processing unit for use during ICLIMBs and OCLIMBs. The area is allocated by the operating system, but once allocated, a CPU register, the Safestore Register, is loaded to provide the CPU visibility to this area. When a CPU faults, it stores the program visible registers automatically into this area. When the OCLIMB instruction is executed, it reloads the registers from this stack.

SCDR—Scan Character Double Reverse. A Multi-Word EIS instruction that scans a contiguous set of characters that are identified by d1, searching for a match to a specific pair of characters identified by d2. This instruction scans the characters until a match is found or until the number of characters to process (as identified by d1's length) is exhausted.

SCMR—Scan Character Mask Reverse. A Multi-Word EIS instruction that is very similar to the SCDR instruction in that it is used for scanning a set of contiguous characters. It differs in that a mask can be defined to allow for variation in the characters involved.

Segment Descriptor (sometimes abbreviated as "SD" or "sd" depending upon the context)—A hardware register controlled by software for the purpose of isolating specific data. It has a base that defines the lower addressing range of the segment and a bound field for typically identifying the high-end or number of words framed by the segment.

TCTR—Test Character and Translate Reverse. A Multi-Word EIS instruction that permits searching a set of contiguous characters (identified by d1) hunting for a match to more than one character. D2 points to a table that the user of the instruction must define. This table must have a non-zero entry for the characters that the user desires to terminate the search on. As the instruction processes a character, it looks up the character's entry in the table to determine whether or not the character is one on which to terminate execution. If the table entry is zero, the instruction checks the next character and so on until a "match" or the length is exhausted.

Virtual Address—The sum of the effective address and its associated segment descriptor base.

XEC—An instruction that points to an instruction to be executed.

y field—The effective address field contained within a d1 etc.

BASIC ARCHITECTURAL CONSIDERATIONS

In order to fully understand the subject invention, it is necessary to have a fundamental appreciation of the relationship between computer hardware, firmware (if employed), operating system software, application software and "the outside world". Thus, referring to FIG. 1, it will be seen that a typical computer system can be roughly divided into four components: hardware 1, the operating system 2, applications programs 3 and users 4. The hardware 1 provides the basic computing resources. The applications programs 3 define the utilization of these resources to solve the computing problems of the users 4. The operating system 2 controls and coordinates the use of the hardware among the various applications programs for the users. Thus, it performs no useful function by itself, but rather provides an environment within which other programs can do useful work.

Computer hardware is the basic computer resource which includes all physical devices such as input/output, the central processing unit(s), memory, magnetic reading devices, disks and any other components which may be physically attached to the computer. In contrast, the operating system controls and coordinates the use of the hardware among various applications programs for the various users. Computer hardware by itself will not do anything; i.e., simply entering applications software and data into a computer will not make a computer function. The operating system provides the necessary means for the proper use of the hardware resources in conjunction with applications software and data. In essence, the operating system operates, or controls, the computer system.

The operating system can also be viewed as a resource allocator. A computer system uses many resources, hardware and software, which may be required to solve a problem: central processing unit time, memory space, file storage, input/output devices and others. The operating system manages these resources and allocates them to specific programs and users for performing their tasks. There can be many competing and conflicting requests for hardware resources and software resources, and the operating system provides a priority system for deciding which requests are allocated to operate the computer system fairly and efficiently.

Figure 2:
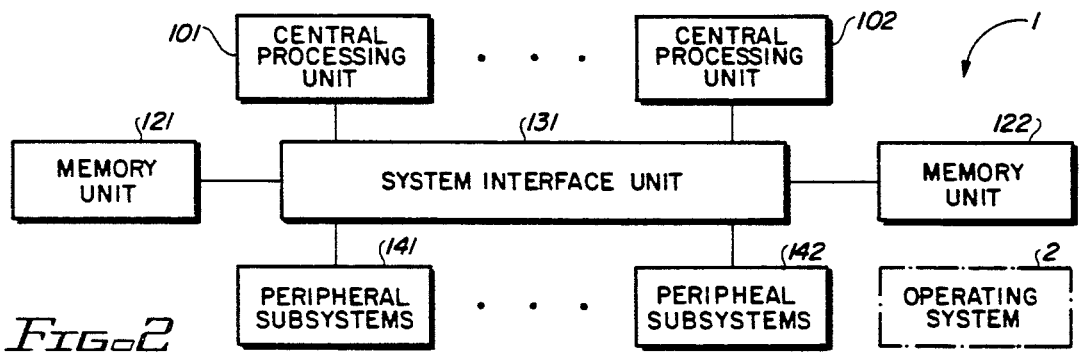
FIG. 2 is a block diagram of a typical computer system.
Figure 3:
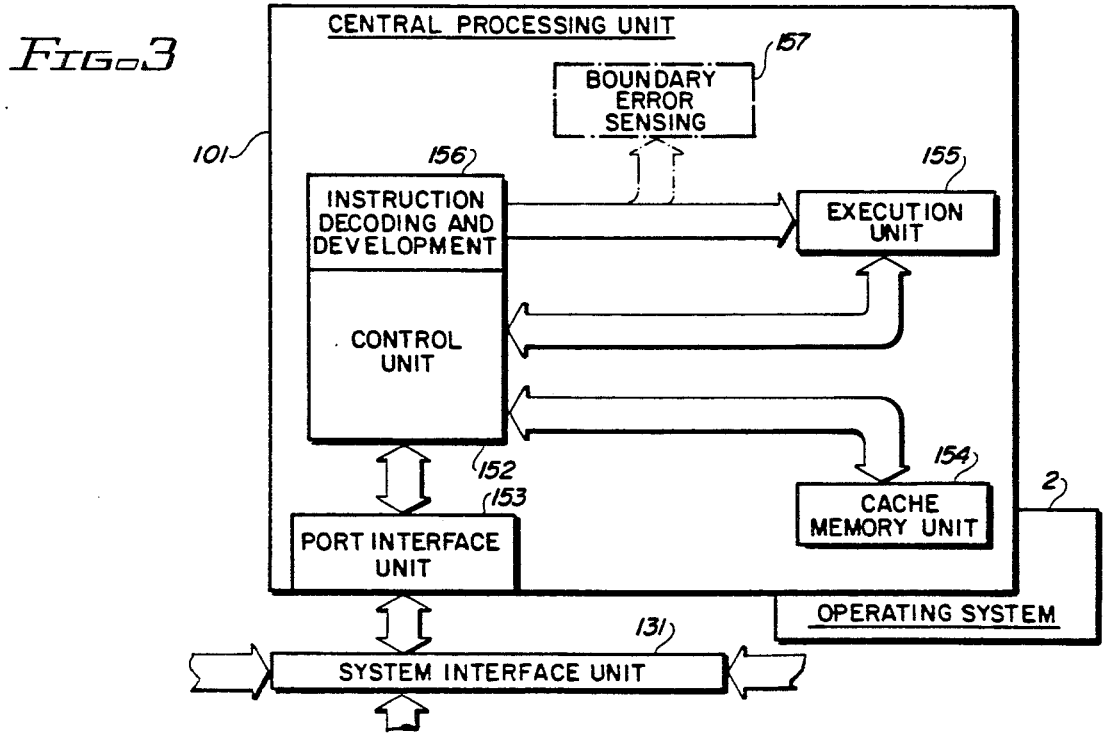
FIG. 3 is a high level block diagram of a typical central processing unit.

Referring now to FIGS. 2 and 3, representative computer hardware 1 will be discussed. In FIG. 2, a general block diagram of a data processing system is shown. One or more central processing units 101 through 102 can be coupled to a system interface unit 131. The system interface unit 131 can also be coupled to one or more memory units 121 through 122. Finally, the system interface unit can be coupled to a plurality of peripheral subsystems 141 through 142. In the background, there is the ongoing presence of the operating system 2 as previously described. Those skilled in the art will understand that FIG. 2 is a typical data processing system configuration, there being many other configurations in general use.

FIG. 3 is a generalized block diagram of a typical central processing unit 101. The flow of data signals in the central processing unit and from external apparatus is shown. During operation, sequences of data are extracted from the memory units by the system interface unit 131 and are utilized within the central processing unit. The system interface unit 131 is coupled to the central processing unit through the port interface unit 153 which serves, along with other activities, to synchronize the flow of data from the asynchronous system interface unit and associated devices. Data from the system memory is then transferred to the control unit 152 and subsequently to the execution unit 155 for processing according to instructions decoded by the instruction decoding and development section 156 of the control unit. The data can also be transferred to the cache memory unit 154 for temporary storage. The cache memory unit is typically used to store data having a high probability of usage by the central processing unit so that such data will be more readily available for processing.

Upon completion of the processing, control unit 152 applies the resultant data to the port interface unit 153 which then transfers the data to the peripheral subsystem 141, 142 or to the memory unit 121, 122 as required by the operating system or currently active applications program. Again, those skilled in the art will understand that FIG. 3 shows a typical central processing unit configuration, there being many other configurations in general use.

A typical central processing unit 101 will include many error sensing capabilities which may be implemented in hardware, firmware and/or software, and among the error sensing facilities which may be provided is boundary error sensing facility as represented by the block 157 in FIG. 3. Thus, the purpose of block 157 is to alert the operating system to the fact that an address developed in the normal operation of the instruction decoding and development block 156 does not fall within the addressable boundaries of the system memories or within the valid boundaries for the process, or program, in progress by producing a boundary error message to alert the operating system that a boundary error has been sensed by the boundary error sensing facility 157. A straightforward response to sensing a boundary error is to issue a boundary error message, perhaps after a retry to eliminate the possibility that an error in decoding and development took place.

An anomalous situation occurs when a false boundary error condition is sensed. This condition can arise when there is a subtle design error in the instruction decoding and development block 156 such that, under certain rarely occurring address development conditions, or boundary error provoking conditions, a false boundary fault, or error condition, is sensed, and a false boundary error message is issued. Upon retry, it will again recur. If the specific hardware in which the design error is discovered is still in development, it can simply be corrected by effecting appropriate changes in the decoding hardware, firmware or combination of hardware and firmware as may be applicable to a given central processing unit. However, if the condition is so elusive that it is only discovered after numerous systems have been installed for commercial and/or other field operation, the cost of correcting the hardware/firmware can be virtually prohibitive, particularly if the system type is nearing the end of its life cycle. According to the present invention, the correction of a false boundary fault, or error, condition is effected by its efficient handling in the operating system, or by the operation system having a method of recovering from the production of a false boundary error message.

DEFINITION AND CHARACTERISTICS OF THE EXEMPLARY PROBLEM

The invention will be disclosed in the environment of the solution to a specific problem that was encountered in an actual computer system which had been in the field for some years and was approaching its end-of-life-cycle such that replacement of hardware and/or firmware in the field would have been prohibitively expensive. This system employs an operating system, GCOS 8, which is also used in other large scale computer systems in the product line of Bull HN Information Systems Inc. However, the principles of the invention are applicable to systems using other operating systems, proprietary and non-proprietary.

The exemplary problem, which was corrected by applying the principles of the present invention, was that a false boundary fault could occur (under certain rare conditions) and a false boundary error message would be issued by the boundary error sensing facility. while executing a limited set of instructions; namely, the MRL, TCTR, SCDR, or SCMR instruction (which, as will be discussed further below, all fall within a certain class of GCOS 8 assembly language instructions) on only one of the several families of processors for which GCOS 8 is the preferred operating system. When the error was sensed, the operand that the bound fault occurred relative to was, in fact, completely within its associated segment boundaries. Thus, instead of faulting, the instruction should have completed as defined (assuming that all other operands did not exceed their respective segment boundaries). It was determined that this false bound fault was due to a subtle hardware design oversight.

After analysis of the problem was complete, it was concluded that, contrary to accepted practice as will be discussed below, it might be possible to handle it in the operating system's fault handling software because of the following characteristics:

1. The error always resulted in a processor fault; therefore, the operating system was always notified when the problem occurred. (This is elementary, but critical. Errors that occur without an associated fault cannot be recovered by the operating system. Instead they must be corrected by hardware modifications or a software avoidance practice.)

2. The expected error frequency was low so that the overhead associated with having the operating system mask the error would be tolerable. However, the correction had to be universal so that it could not merely be directed at a specific compiler or at a particular process' Domain Exception Procedure (DEP). Changes at those levels would be unmanageable.

3. Solving the error using the operating system's fault handler would ensure that the error is corrected, regardless of the source or application. (The goal of the recovery procedure was to complete the faulting instruction so that the desired data processing is achieved, the fault and the recovery mechanism being invisible to the affected process.)

The key to understanding the inventive recovery process is to first fully comprehend the exemplary problem from a software perspective.

The factors that must be intertwined, or present, to produce the false bound fault, or boundary fault, and a false boundary error message are:

1. The faulting instruction must be MRL, SCDR, SCMR or TCTR.

2. The operand string 1, on which the bound fault occurs, must be greater than one character in length, but less than 16 (decimal) characters if in nine bit character mode, or less than 31 (decimal) characters if in four bit character mode. (This length criteria need only be true when the virtual address lower bound check is performed either at the start of the instruction's execution or during a resumption from a mid-instruction interrupt where the length in question is the remaining length, not the initial length.)

3. The operand string 1 must be framed by a descriptor that has a character (byte) offset specified between one and seven.

4. The operand string 1's initial effective address must be approximately zero. (The sum of the relative descriptor base's character-byte-offset and effective address must be between one and seven characters.)

5. The segment descriptor's bounds field is sufficiently large to frame the character string to be processed. When an operand string is sufficiently framed, any bound fault occurring during the access of that operand is false.

The problem with the exemplary central processing unit hardware was that, when all these conditions are true, a bound fault occurs during the effective address verification cycle when the calculated EAi and descriptor base reside in the same word pair. For example, the following case (in which all numeric values are expressed in octal) would produce the undesirable bound fault:

| | | |
|---|---|---|
| lddl | drlvec | DR1 = 000177710640,000001000001 |
| mrl | (ar,,,),(,,,) | move (copy) string 1 to string 2 |
| adsc9 | 0,,14,p1 | operand string 1 framed by DR1 |
| adsc9 | rsvloc,,14 | operand string 2 located at rsvloc |

| | | |
|---|---|---|
| + 3 | x 0 0 0 | |
| + 2 | x x x x | Operand string 1, |
| + 1 | x x x x | represented by x(s), within its data segment. |
| DR1 base + 0 | 0\|x x x | |

This example illustrates an operand string 1 that is framed by a segment descriptor that has a one character offset. Because the length specifies that 12 (i.e., $14_8$)) characters must be moved, the upper effective address generated will be within four words of the base, and the lower effective address will be zero. Hence, all the conditions required to produce a false bound fault are present.

If the DR1 base had been modulo-2 words (byte offset equal zero) and the effective address had been 0,1 (word 0, byte 1), then the same data would have been processed, and no bound fault would have occurred. This rearrangement of the byte offset ownership is the basis of the recovery process that will be described in the following section. Although the "switch" is deceptively simple, it defies traditional hardware architecture by transferring virtual address components into the effective address calculation cycle to avoid the false error. Traditionally, effective addresses must be subservient to the segment descriptor base that is added to form the virtual address. This is because the segment descriptor's base and bounds provide much more than just a frame for a data area, for they also provide data isolation which translates into data security. The actual value of a particular DRn's base is often invisible to the user who wrote the program; it only frames the data segment. To actually "expand" an operand segment descriptor (i.e., give the user more visibility than it was originally intended to have—which is what the invention does) would violate system security except that the expansion is kept completely isolated from the user (i.e., the expansion is evident only during the controlled execution of a single instruction that will not address the unauthorized data because of adjustments made to the effective address by the same operating system software that expanded the segment.) Thus, those skilled in the art will understand that the invention crosses traditional addressing hierarchy, but is nonetheless implemented in the operating system in such a manner as to protect against a breach in data security.

OVERVIEW OF THE SOLUTION TO THE PROBLEM

To fully understand the following technical presentation, it is useful to have a basic knowledge of the four multiword EIS instructions that are subject to the false bound fault. The multiword EIS instructions are so named because they require multiple words to specify the task to perform and describe the characterisitics of the data to be processed.

MRL—The MRL instruction is a multiword EIS instruction that moves data from one operand to another. The multiple words, in the MRL case, consist of an instruction word (word one), the first operand (sending string) descriptor word (word two, commonly referred to as d1) and the second operand (receiving string) descriptor word (word three, commonly referred to as d2). The operand to be processed is a byte entity. The byte sizes may be either nine bit (ASCII), six bit (BCD) or four bit (packed) in format.

The MRL instruction is used to process variable numbers of bytes starting at a variable byte position within a defined segment. The number of bytes to process (or length) can be a value ranging from zero to one million, and a different length may be specified for the two operands. When the lengths vary, either "fill" (the receive length is greater than the sending length) or "truncation" (the sending length is greater than the receiving length) will occur.

An MRL instruction is typically coded as follows:

```
mrl     (a1,r1,i1,e1),(a2,r2,i2,e2)
adsc9   y1,b1,l1,p1
```

-continued

```
adsc9   y2,b2,l2,p2
```

Where:
- a(n)=ar/dr option selection (nonzero=selected)
- r(n)=register length option selection
- i(n)=indirection option
- e(n)=register effective address modification option
- y(n)=an effective address word specification
- b(n)=a byte offset to the effective address
- l(n)=the length or number of characters to process
- p(n)=optional, only valid if a(n) is selected; the operand segment descriptor identifier.

The SCDR, SCMR and TCTR instructions use d1 in the same manner as the MRL. They also have an identical MF1 field and options. Their d2 and d3 fields differ, but this is of no consequence because the problem which is solved by the subject invention lies in the d1 operand access (addressing) independent of d2 and d3. So if the problem and its solution is understood from the perspective of the MRL, it is understood from the perspective of all four instructions.

THE RECOVERY PROCESS

The recovery process consists of switching the various virtual address elements so that the final virtual address is equal to the virtual address calculated under the failure conditions, but the descriptor's byte offset component is transferred to and added to d1's effective address. This switch is performed by the fault processing functionality within the operating system after the process has faulted as a result of executing one of the four suspect instructions.

Prior to making this switch, a great deal of analysis etc., must be performed, and this overhead will be discussed in detail in later sections. However, the following example will illustrate the recovery process at the conceptual level.

Failure virtual address components:

| effective address | 000000,0 | word 0, byte 0 |
|---|---|---|
| descriptor base | + 200000,1 | page 100, byte 1 |
| virtual address d1 | 200000,1 | |

The recovery process consists of switching, or transferring the byte offset from the descriptor base address to the effective address by adding it to the effective address and subtracting it from the descriptor base address as shown below.

Modified virtual address components:

| effective address | 000000,1 | word 0, byte 1 |
|---|---|---|
| descriptor base | + 200000,0 | page 100, byte 0 |
| virtual address d1 | 200000,1 | |

It should be noted that the virtual address produced from the modified virtual address components, the translated virtual address, has the same value as, or equals, the virtual address found in line 7 above produced using the values of the address components before being modified.

Figure 4:
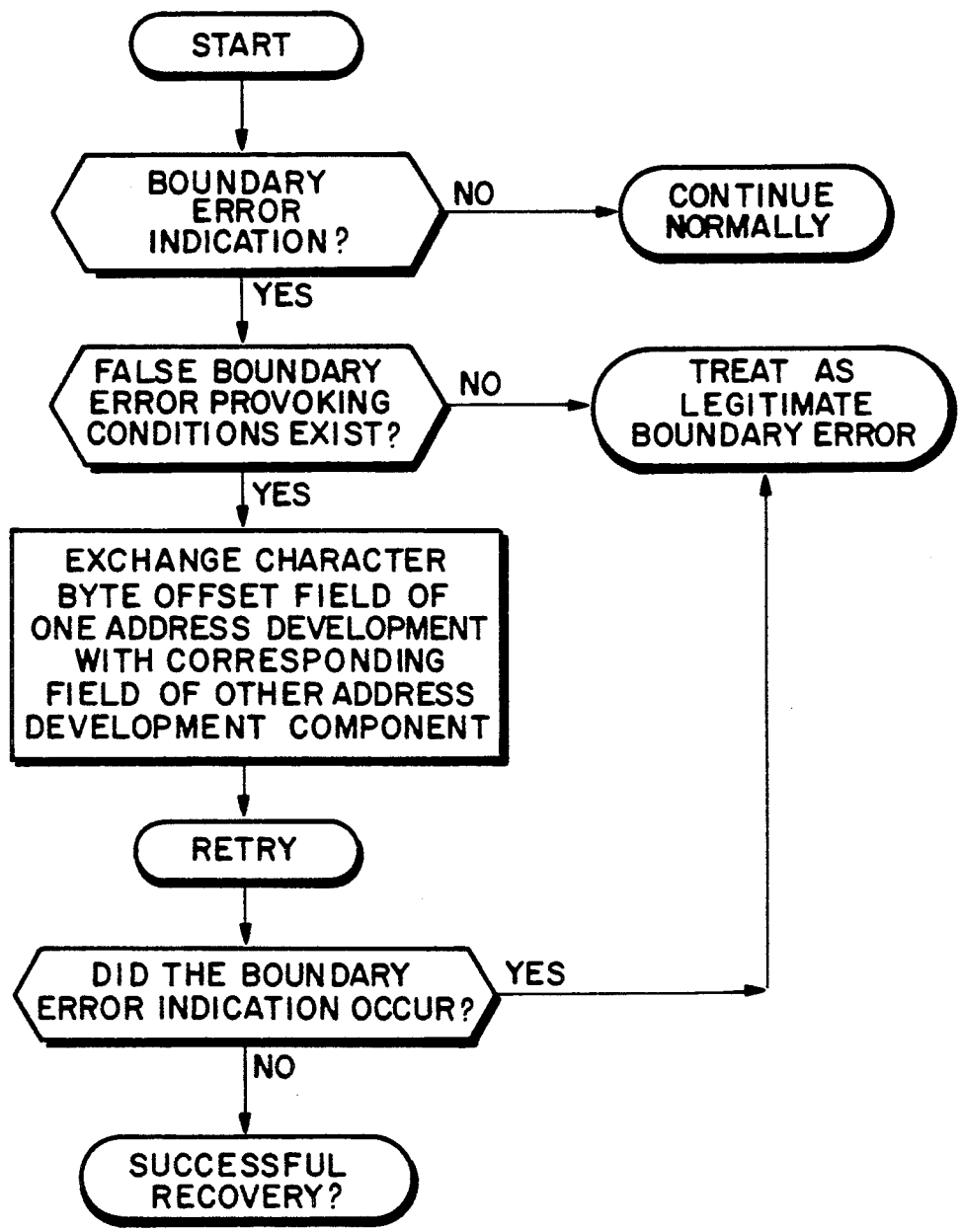
FIG. 4 is a basic flow chart of the inventive process.

FIG. 4 is a basic flow chart illustrating the inventive process in additional detail. It will be seen that the process masks the problem by remapping the virtual address components of the faulting instruction so that the final virtual address, though identical to the failing one, is processed without fault by the central processor unit during recovery. Thus, the data characters processed will be exactly those intended because the real memory address that will be generated will be identical, following the application of the recovery process, to the address that would have been developed if the hardware had handled the bound fault analysis correctly.

Not only must the segment descriptor's base be modified to be modulo-2, but the descriptor's bound field must be incremented by the same number of characters that were added to the effective address component. Otherwise, should the descriptor precisely frame the number of characters to be processed, a bound fault would occur during the upper effective address bounds check. This is because bound checks on the high-end consist of a comparison of the bound field versus EAf which equals EA1 lower+(length−1).

RECOVERY CANDIDATE ACQUISITION

To perform the analysis required to determine whether a particular bound fault case should be considered for recovery according to the invention, the faulting instruction and its alphanumeric descriptors or pointers must be fetched. Typically, a faulting instruction is identified by using the processor instruction counter as an offset relative to the process' ISR, both of which are found in the fault's safestore stack frame. But with multi-word EIS instructions, where each instruction word is critical for this procedure, further searching may be required.

The multiword EIS instructions support a variety of options, many of which must be dealt with in order to fetch all the particulars relevant to the failure analysis. Whereas the MRL example given above was very straightforward; i.e., the instruction and its d1 and d2 were implied to be contiguous, indirection can be utilized to access either the instruction or its descriptors.

The following two examples illustrate the challenges involved in acquiring the full instruction for analysis:

EXAMPLE 1—XEC utilization

|       | ldx5  | 1,du       |
|-------|-------|------------|
|       | xec   | xyz,x5     |
|       | adsc9 | op1,,10,p1 |
|       | arg   | ttable,,p2 |
|       | arg   | result     |
| zyz+0 | tct   | (ar)       |
| +1    | tctr  | (ar)       |

It will be seen that the problematical TCTR instruction is only found after noting that the XEC instruction, identified through conventional methods of instruction referencing, is unique. The error correction procedure must recognize that an XEC instruction results in the execution of the instruction identified by the XEC's operand address. This requires that software reconstruct the XEC's addressing to acquire the target TCTR instruction.

EXAMPLE 2—indirection on d1 or d2

| n    | mrl   | (ar,,id,),(,,,) |
|------|-------|-----------------|
| n+1  | arg   | zzz1            |
| n+2  | adsc9 | rcv1,,12        |
| n... |       |                 |

-continued

| zzz1 | adsc9 | 0,1,12,p1 |
|------|-------|-----------|

This example illustrates the case where the instruction's alphanumeric descriptors are attained by reconstructing indirect addresses. The software recovery preparation functionality must be implemented so that, regardless of the modification(s) used to address the indirect word, the required word can be fetched.

Once the instruction and its alphanumeric descriptors have been fetched, an analysis can be made to determine whether the instruction is a candidate for bound fault recovery.

RECOVERY CANDIDATE ANALYSIS

The recovery candidate analysis process primarily deals with ensuring that the failure case has the symptoms noted earlier during the definition of the exemplary error. Verification of d1 descriptor modification and the descriptor byte offset is very straightforward. The op-code word identifies the descriptor option, and d1 identifies the descriptor number referenced. After the appropriate descriptor has been fetched from the safestore frame, it is simple enough to check for the byte offset.

The most challenging prerequisite check to perform is that of determining whether the effective address is approximately zero. All effective address components must be summed together to determine the initial effective address. For example, the following instruction sequence:

| lda   | 1,d1        | a1 = a character offset |
| awdx  | −4,,p1      | ar1 = a word offset     |
| mr1   | (ar,,,a1),(,,,) |                     |
| adsc9 | 4,,10,p1    | y = a word offset       |
| adsc9 | rcv2,,10    |                         | would result in an initial EAi 1 calculation of:

| ar4        | 777774,0   |
| y          | 000004,0   |
| a1         | + 000000,1 |
| initial EA | 000000,1   |

These effective address components, are drawn from the safestore frame except for the d1 y field that must be fetched from the instruction segment associated with the fault. This effective address must be calculated not only to determine whether the case qualifies for the recovery, but also because the effective address is one of the components that is adjusted during the application of the recovery process.

Since, if these three checks are true, the bound fault is probably false, a fourth check of the high-end effective address versus the segment's upper bounds is preferably not made although it could be for complete assurance that a false bound fault has occurred. This deliberate omission eliminates an added level of complexity that is ordinarily not justified considering the method implemented for control of the recovery process.

THE RECOVERY MECHANISM

As previously noted, it was determined that retrying the instruction within, or under the control of the operating system would be the most effective means of recovering from the fault. The alternative would have been to retry within the faulting process' instruction segment, a complex and error prone alternative. To perform the recovery within the faulting process' instruction segment, the instruction segment would have had to have been modified as well as a unique safestore frame entry established for controlled recovery.

By retrying the instruction within the operating system, should the bound fault reoccur, perhaps because of a legitimate upper effective address out-of-bounds condition, then the bound fault frame for this recovery attempt would be laid down on the safestore stack above the original faulting frame. This frame would be at a very convenient position to be disposed of with the original fault then honored as legitimate, or correct. Also, when the recovery is unsuccessful, the process' instruction segment need not be reset to its original state.

The requirement for modifying the instruction segment may need some clarification. Regardless of the recovery alternative taken, the d1 y field probably would need some adjustment to compensate for the effective address change inasmuch as the simplest method for handling the effective address conversion is to calculate the new effective address and place it into an address register. Therefore, the d1 y field's effective address is always zeroed, and the mf1 field's register specification is eliminated as well.

Because the instruction is to be reexecuted within the operating system, not the process' instruction segment, several other modifications must be made. To simplify this explanation, the following example will be analyzed.

Example of instruction modification

| | | | |
|---|---|---|---|
| mrl | (ar,r1,id,al),(,,,) | 000000101565 | (assembled |
| arg | xyzzz | 022222000000 | format) |
| adsc9 | rcv3,,10 | 033333000010 | |
| xyzzz adsc9 | 0,1,x1,p1 | 100000200011 | |

This is reduced to the following for recovery within the operating system:

| | | |
|---|---|---|
| mrl | (ar,r1,,),(ar,,,) | 000100101540 |
| adsc9 | 0,,x1,p5 | 500000000011 |
| adsc9 | 0,,10,p6 | 600000000010 |

As illustrated in the above example, each alphanumeric descriptor is assigned a segment descriptor. The instruction's d1 is assigned DR5 while d2 is assigned DR6. The other instructions that require this recovery have a d3 for which DR7 is the allocated descriptor for visibility back to the operand storage area. This assignment is undertaken out of necessity because certain descriptors are dedicated to the procedure during this recovery preparation for various purposes. The descriptor contents are either the original descriptor, a modified copy of the original descriptor (d1's case) or a pointer with the DR value equal to the ISR at the time of the fault. This ensures operand access, from the operating system's segment where the instruction to be recovered is executed, back into the operand area to be processed. It is during this processing of d1 that the recovery process is applied.

One other aspect to treat when performing the recovery from within the operating system is the handling of processor instruction counter modification. This modification, unlike others, must be factored into the effective address and its reference eliminated prior to the recovery attempt. Otherwise, the central processor unit's instruction counter used in effective address preparation during the recovery would be that of the recovery location within the operating system.

With the instruction modified for recovery, it becomes a candidate for the retry buffer. The retry buffer is gated to simplify internal operating system fault control so that, if the instruction faults during the recovery execution, it can be quickly identified and the process sent on to termination. (All the preparation work is preferably done within a unique scratch data buffer, thus ensuring that the bulk of this processing is reentrant.)

When the recovery gate is open, the processor performing the recovery will shut it, then copy the instruction into the buffer, perform an LREG instruction to fetch registers from the safestore stack and execute the instruction. If the instruction completes successfully, the recovery gate is opened, and the indicator results are prepared for return to the fault's original safestore frame. The mif indicator must be reset and the master mode indicator conditionally reset, before the new indicator register is written into the frame.

Also, following a successful recovery, the return central processor unit instruction counter must be adjusted to the first instruction following the faulting instruction; i.e., either a value of three must be added for MRL recovery, or four for those instructions with a d3 component. Finally the return of control is performed by OCLIMBing back through the slightly adjusted bound fault safestore frame.

MID-INSTRUCTION INTERRUPT RECOVERY

The prerecovery instruction modification specified represents the normal changes to the instruction that are required. But when an MRL mid-instruction recovery is required, the lengths for both d1 and d2 are tailored for the situation.

As was described earlier, this error condition can occur, regardless of the length involved, if the instruction is interrupted in such a manner that the hardware's restart effective address calculations fall within the error definition. This case is simple enough to recover from for the TCTR, SCDR and SCMR instructions because they do not have operand strings that can be overlapped. These instructions are processed in the same manner as the shorter length cases except that a window for taking interrupts to prevent possible lockup faults must be provided within the operating system.

Because of the possibility of an overlap of operand strings, the interrupted MRL is prepared for recovery in a unique manner. It was determined that the remaining length for the receiving string (operand string 2) represented the exact number of characters remaining to process when the false bound fault occurred. (this information is available in the pointer and length data within the faulting frame.) With the remaining 12 known, the 11 required for resumption can be readily derived: the adjusted 11 for resumption equals the initial 11 minus the initial 12 , plus the remaining 12. With this information, the MRL instruction can be prepared for recovery in the normal manner except that the 11 and 12 fields are set equal to the calculated 11 and the remaining 12 values, respectively. This resumption technique ensures that all interruption related MRL cases can be completed without a risk of data corruption. It also results in a more efficient recovery that would a total restart following address parameter adjustment.

PERFORMANCE CONSIDERATIONS

It is expected that, when using operating system software to compensate for hardware limitations, the system's performance will be somewhat degraded. Performance degradation is a critical concern that must always be addressed before implementing a permanent software procedure to mask a hardware limitation. Intuitively, it is appreciated that, for optimum performance, the hardware/firmware must be corrected, but the hardware/firmware correction may be prohibitively expensive or inconvenient as previously discussed. Thus, the system performance loss must always be viewed in light of the cost of the various correction alternatives.

In the exemplary case, the use of operating system software to rectify the problem resulted in a negligible degree of system performance degradation. This perception is based upon the rarity of reported error instances in the field. An estimate of the number of instructions executed to handle the fault and perform the recovery is one thousand. But, to give this figure additional perspective, consider that approximately the same amount of overhead is required to process a missing page fault for the exemplary hardware platform.

FLOW CHART OF AN EXEMPLARY APPLICATION OF THE INVENTION

Figure 5A:
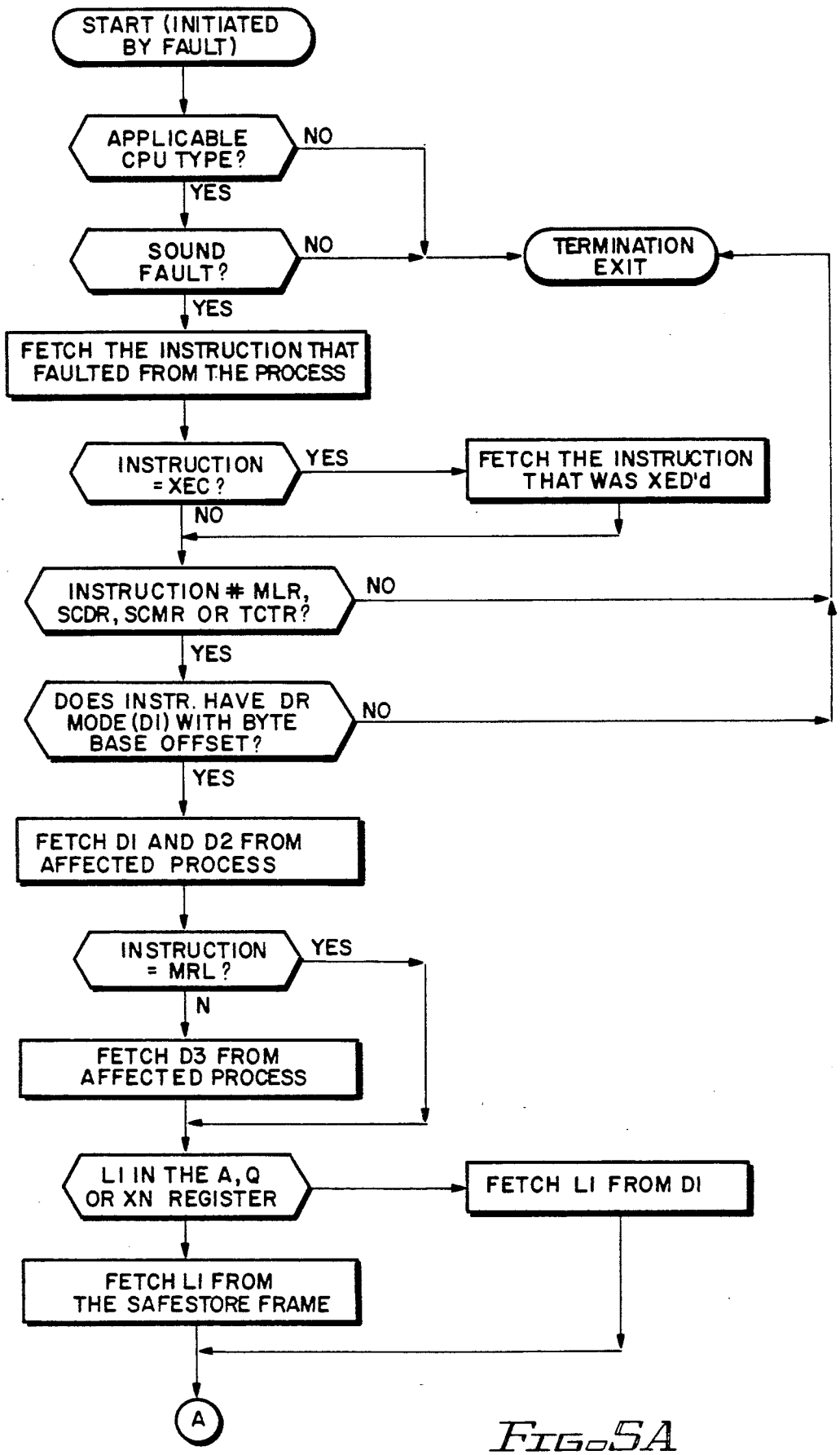
Figure 5B:
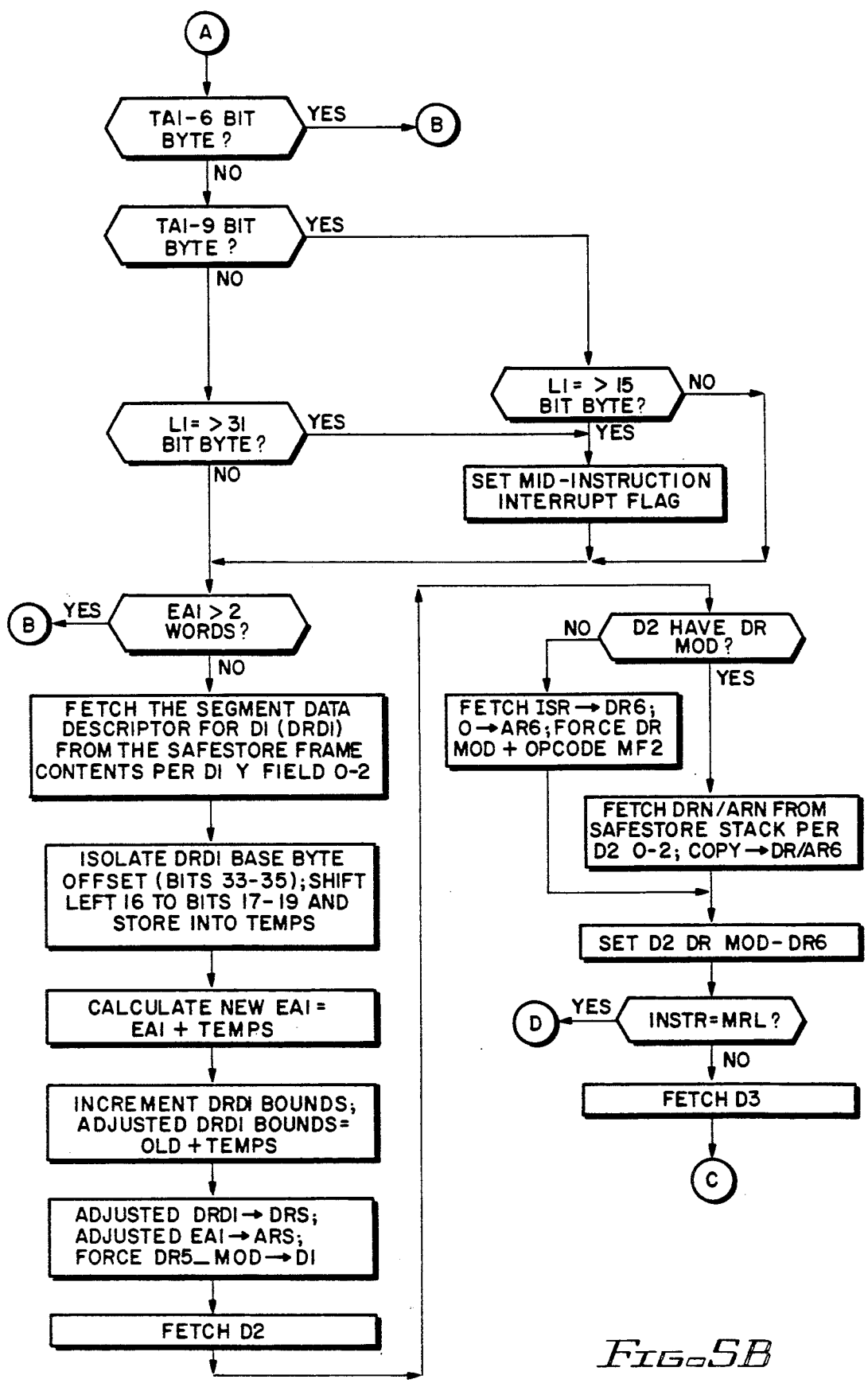

Attention is now directed to FIGS. 5A, 5B and 5C which, taken together, constitutes a complete flow chart representation of the process described above as it may be practiced in the exemplary environment of a computer system having the described hardware/firmware fault and employing the GCOS 8 operating system.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a computer system having a central processing unit for executing instructions under the control of an operating system; the central processing unit including instruction decoding and development means for decoding instructions in execution and for developing a memory address for an instruction in execution by the central processing unit, execution unit means for processing data according to the instruction in execution as decoded by the instruction decoding and development means, and boundary error sensing means for producing a boundary error message for alerting the operating system when the memory address developed by the instruction decoding and development means for the instruction in execution does not fall within the boundaries of a predetermined block of memory addresses, the instruction in execution with respect to which a boundary error message is produced, hereinafter referred to as a faulting instruction; the instruction decoding and development means utilizing a first and a second address development components of the instruction in execution to develop a memory address for the instruction in execution, both the first and the second address development components including a byte offset field; and the boundary error sensing means producing a false boundary error message under certain known boundary error provoking conditions; a method for recovering from such a false boundary error message comprising the steps of:

A) determining if the certain known boundary error provoking conditions are present when the boundary error sensing means produces a boundary error message;
  1) terminating the method if the known boundary error provoking conditions are not present, the boundary error message being deemed to be correct;
  2) proceeding to step B) if the known boundary error provoking conditions are present;
B) producing a modified first and a modified second address component by transferring the byte offset field of the second address development component to the first address development component, and causing the instruction decoding and development means to develop a translated memory address for the faulting instruction using the modified first and second address components, said translated memory address being the same as the memory address for which a false boundary error message was produced;
C) if the boundary error sensing means does not produce a boundary error message for the translated address for the faulting instruction developed in step B); permitting the execution of the faulting instruction to completion by the central processing unit;
D) if the boundary error sensing means produces a boundary error message for the translated address developed in step B), the error message is deemed to be correct, and execution of the faulting instruction by the central processing unit is terminated.

2. The method of claim 1 in which the memory address developed by the instruction decoding and development means is a virtual memory address.

3. The method of claim 2 in which transferring the byte offset field of the second address development component is accomplished by adding the byte offset field of the second address development component to the first address development component and by subtracting the byte offset field of the second address development component from the second address development component.

4. The method of claim 3 in which the first address development component is an effective address.

5. The method of claim 4 in which the second address development component is a description base address.

6. The method of claim 5 in which steps A), B), C), and D) are performed within the operating system.

* * * * *